(12) United States Patent
Nagayama et al.

(10) Patent No.: US 6,892,019 B2
(45) Date of Patent: May 10, 2005

(54) OPTICAL FIBER, METHOD OF MAKING OPTICAL FIBER PREFORM, AND METHOD OF MAKING OPTICAL FIBER

(75) Inventors: Katsuya Nagayama, Yokohama (JP); Kiichiro Kawasaki, Yokohama (JP); Takatoshi Kato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 62 days.

(21) Appl. No.: 10/747,092

(22) Filed: Dec. 30, 2003

(65) Prior Publication Data

US 2004/0151455 A1 Aug. 5, 2004

Related U.S. Application Data

(62) Division of application No. 09/939,741, filed on Aug. 28, 2001, now Pat. No. 6,681,072.

(30) Foreign Application Priority Data

Aug. 28, 2000 (JP) .................................... P2000-257857

(51) Int. Cl.⁷ .............................................. G02B 6/02
(52) U.S. Cl. ...................................................... 385/127
(58) Field of Search ................................ 385/123–128, 385/140–145

(56) References Cited

U.S. PATENT DOCUMENTS

| | | | | |
|---|---|---|---|---|
| 4,025,156 A | * | 5/1977 | Gloge et al. ................. | 385/124 |
| 4,229,070 A | * | 10/1980 | Olshansky et al. .......... | 385/124 |
| 4,230,396 A | * | 10/1980 | Olshansky et al. .......... | 385/124 |
| 4,372,647 A | | 2/1983 | Okamoto et al. | |
| 4,566,754 A | * | 1/1986 | Beales et al. ............... | 385/123 |
| 4,664,474 A | | 5/1987 | Tanaka et al. | |
| 4,690,504 A | | 9/1987 | Yokokawa et al. | |
| 4,733,939 A | | 3/1988 | Utsumi et al. | |
| 5,742,722 A | | 4/1998 | Imoto | |
| 5,802,235 A | | 9/1998 | Akasaka | |
| 5,841,926 A | | 11/1998 | Takeuchi et al. | |
| 5,913,005 A | | 6/1999 | Terasawa et al. | |

FOREIGN PATENT DOCUMENTS

| | | |
|---|---|---|
| EP | 0 851 247 A2 | 7/1998 |
| JP | 60-263103 | 12/1985 |
| JP | 64-87526 | 3/1989 |
| JP | 2-113205 | 4/1990 |

OTHER PUBLICATIONS

"Drawing Condition Dependence of Pure–Silica–Core Single–Mode Fibers", Fumiaki Hanawa et al., NTT Opto–Electronics Laboratories, Mar. 1989, vol. J72–C–I, No. 3, pp. 167–176 (w/ English Translation).

"Relaxation of Rayleigh Scattering in Silica Core Optical Fiber with heat Treatment", Shigeki Sakaguchi, NTT Photonics Laboratories, Jan. 2000, vol. J83–C, No. 1, pp. 30–36 (w/ English Translation).

* cited by examiner

Primary Examiner—J. F. Duverne
(74) Attorney, Agent, or Firm—McDermott Will & Emery LLP

(57) ABSTRACT

An optical fiber comprising a core region 100 doped with Cl which raises the refractive index; and a cladding region 200, provided at the outer periphery of the core region 100, having a cladding layer 201 doped with F which lowers the refractive index is formed. The cladding region 201 to become the outermost cladding layer is configured such that the doping amount of F successively decreases within an outer peripheral part 205 including the outer periphery thereof to a predetermined doping amount which is the minimum doping amount of F within the cladding layer 201. Therefore, the stress within the optical fiber is dispersed into the outer peripheral part 205 having an enhanced viscosity, whereby the stress concentration into the core is suppressed. Since the favorable tension range at the time of drawing the optical fiber becomes wider at this time, tension control is facilitated.

7 Claims, 8 Drawing Sheets

OPTICAL FIBER, METHOD OF MAKING OPTICAL FIBER PREFORM, AND METHOD OF MAKING OPTICAL FIBER

This application is a divisional of application Ser. No. 09/939,741 filed Aug. 28, 2001 now U.S. Pat. No. 6,681,072.

BACKGROUND OF THE INVENTION

1. Field of the Invention

The present invention relates to an optical fiber for transmitting light, a method of making an optical fiber preform, and a method of making an optical fiber.

2. Related Background Art

In light transmissions using an optical fiber, transmission loss such as Rayleigh scattering loss caused by Rayleigh scattering within the optical fiber, structural asymmetry loss caused by disturbance in structures within the optical fiber, and the like becomes problematic.

These kinds of transmission loss are greatly influenced by the tension applied to the optical fiber when making the optical fiber by drawing an optical fiber preform upon heating. Namely, if the tension applied to the optical fiber is too low or too high with respect to the tension range considered favorable at the time of drawing, then the Rayleigh scattering loss, structural asymmetry loss, and the like within the optical fiber may increase. More specifically, the structural asymmetry loss increases at a lower tension. At a higher tension, on the other hand, both the Rayleigh scattering loss and structural asymmetry loss increase. Such a tension at the time of drawing also influences transmission characteristics of the optical fiber other than its transmission loss, its structures, its mechanical strength, and the like.

The tension applied to the optical fiber at the time of drawing usually changes with time during when the optical fiber preform is being drawn upon heating. Consequently, if the optical fiber preform is drawn as it is, the tension applied to the optical fiber preform may vary greatly over the whole length thereof, thereby making it difficult to make a long optical fiber yielding a low transmission loss. Therefore, tension control for keeping the tension within a favorable tension range is necessary in the optical fiber drawing step.

SUMMARY OF THE INVENTION

The above-mentioned favorable tension range at the time of drawing an optical fiber may vary depending on the structure and material of an optical fiber preform, its specific drawing condition, and the like. Here, if the tension range permissible as a drawing condition for yielding a favorable optical fiber is narrow, then it becomes very hard to carry out tension control at a sufficient accuracy over the whole length of the optical fiber preform.

For example, in an optical fiber (optical fiber preform) having a core made of pure $SiO_2$ (pure silica), its core region yields a viscosity higher than that in its cladding region doped with F or the like (see, for example, "Hanawa et al., the Transactions of the Institute of Electronics, Information and Communication Engineers, 1989/3, Vol. J72-C-I, No. 3, pp. 167–176"). Therefore, at the time of drawing the optical fiber preform, the stress occurring within the optical fiber is concentrated into the core, thus causing transmission loss to increase. For restraining the transmission loss from increasing due to the stress concentration into the core in such a case, severe tension control is necessary at a high accuracy, or it may become problematic in that tension control cannot be carried out in such a manner as to sufficiently lower the transmission loss, and so forth.

Also, "Sakaguchi, the Transactions of the Institute of Electronics, Information and Communication Engineers, 2000/1, Vol. J83-C, No. 1, pp. 30–36", discloses that annealing an optical fiber after drawing reduces the Rayleigh scattering within the optical fiber. Namely, the Rayleigh scattering intensity within glass is not constantly fixed by materials thereof, but depends on a fictive temperature Tf which is a virtual temperature indicative of the randomness in the state of arrangement of atoms within glass. Specifically, the Rayleigh scattering intensity increases as the fictive temperature Tf within glass is higher (randomness is greater).

In this regard, when drawing an optical fiber preform upon heating, a heating furnace is installed downstream a drawing furnace and is heated such that the drawn optical fiber attains a temperature within a predetermined temperature range when passing through the heating furnace. As a consequence, the heating by use of the heating furnace prevents the drawn optical fiber from cooling drastically, whereby the optical fiber is annealed. Here, due to the structural relaxation of glass caused by rearrangement of atoms, the fictive temperature Tf within the optical fiber decreases, whereby the Rayleigh scattering intensity within the optical fiber is suppressed.

However, the inventor has found that, even when such a manufacturing method yielding an effect of lowering the Rayleigh scattering loss is used, if the tension at the time of drawing the optical fiber preform is not within the favorable tension range, the structural asymmetry loss will increase due to the stress concentration into the core, and so forth, whereby the transmission loss may not be reduced as a whole.

In order to overcome the foregoing problems, it is an object of the present invention to provide an optical fiber, a method of making an optical fiber preform, and a method of making an optical fiber which facilitate the tension control at the time of drawing.

For achieving such a problem, the optical fiber in accordance with the present invention comprises a core region; and a cladding region, provided at an outer periphery of the core region, having one or a plurality of cladding layers doped with fluorine which lowers a refractive index, wherein the outermost cladding layer of the one or plurality of cladding layers is configured such that fluorine successively lowers the doping amount thereof in an outer peripheral part including an outer periphery thereof to a predetermined doping amount which is the minimum doping amount of fluorine within the layer.

In the above-mentioned optical fiber, among the cladding layers formed as being doped with F (fluorine), the outermost cladding layer is configured so as to yield such an F doping amount distribution that the doping amount of F gradually decreases from the inner side to the outer side within the outer peripheral part (the outer periphery and its vicinity) in the outermost cladding layer. Here, viscosity becomes higher in the outer peripheral part of the outermost cladding layer in which the doping amount of F is smaller, whereby the stress applied to the inside of the optical fiber is dispersed into the outer peripheral part of the outermost cladding layer, which suppresses the stress concentration into the core. Also, this stress dispersion makes it possible to widen the favorable tension range permissible at the time of drawing the optical fiber.

As a consequence, the optical fiber in accordance with the present invention becomes an optical fiber having a configuration which simplifies the tension control at the time of drawing. At the same time, the increase in transmission loss and the deterioration in transmission characteristics are prevented from occurring due to the excessive stress concentration into the core and the like, which realizes an optical fiber having stable transmission characteristics over the whole length thereof.

Since the region reducing the doping amount of F is the outer peripheral part of the outermost cladding layer, the F doping amount distribution has no influence over the light transmitted through the core region and the cladding region in the vicinity thereof. Therefore, while favorably keeping transmission characteristics and the like of the optical fiber, it can facilitate the tension control, or reduce the transmission loss thereby.

The method of making an optical fiber preform in accordance with the present invention comprises: (1) a synthesizing step of depositing a glass fine particle onto an outer periphery of a core preform including at least a core region, so as to synthesize a glass fine particle layer to become the outermost cladding layer in one or a plurality of layers of cladding in a cladding region disposed at an outer periphery of the core region; (2) a dehydrating step of dehydrating the synthesized glass fine particle layer upon heating; and (3) a consolidating step of consolidating the dehydrated glass fine particle layer upon heating so as to form the outermost cladding layer, thus forming an optical fiber preform having the core region and the cladding region having the one or plurality of layers of cladding; wherein (4), before consolidating the glass fine particle layer upon heating, doping the glass fine particle layer with fluorine and eliminating a part of doped fluorine from an outer peripheral part including an outer periphery thereof.

Drawing the optical fiber preform obtained by such a method of making an optical fiber preform makes it possible to yield an optical fiber which is doped with or rid of F such that the doping amount of F within the outer peripheral part in the outermost cladding layer in the cladding layers of the cladding region successively decreases to a predetermined doping amount which is the minimum doping amount of F within the layer.

Alternatively, the method of making an optical fiber preform in accordance with the present invention comprises: (1) a synthesizing step of depositing a glass fine particle onto an outer periphery of a core preform including at least a core region, so as to synthesize a glass fine particle layer to become the outermost cladding layer in one or a plurality of layers of cladding in a cladding region disposed at an outer periphery of the core region; (2) a dehydrating step of dehydrating the synthesized glass fine particle layer upon heating; and (3) a consolidating step of consolidating the dehydrated glass fine particle layer upon heating so as to form the outermost cladding layer, thus forming an optical fiber preform having the core region and the cladding region having the one or plurality of layers of cladding; wherein (4) the glass fine particle layer is synthesized in the synthesizing step such that the glass fine particle layer is doped with fluorine by using a material gas containing fluorine while the material gas containing fluorine is adjusted such that the doping amount of fluorine successively decreases within an outer peripheral part including an outer periphery thereof.

Drawing the optical fiber preform obtained by such a method of making an optical fiber preform similarly makes it possible to yield an optical fiber which is doped with F such that the doping amount of F within the outer peripheral part in the outermost cladding layer successively decreases to a predetermined doping amount which is the minimum doping amount of F within the layer.

The method of making an optical fiber in accordance with the present invention comprises preparing an optical fiber preform comprising a core region, and a cladding region, provided at an outer periphery of the core region, having one or a plurality of cladding layers doped with fluorine which lowers a refractive index, in which the outermost cladding layer of the one or plurality of cladding layers is configured such that fluorine successively lowers the doping amount thereof in an outer peripheral part including an outer periphery thereof to a predetermined doping amount which is the minimum doping amount of fluorine within the layer; and, when drawing the optical fiber preform upon heating, drawing the optical fiber preform at a tension within the range of 0.05 to 0.20 N.

Since the optical fiber preform (optical fiber) has such a configuration that the stress is dispersed into the outer peripheral part of the outer cladding layer, whereas the tension control is carried out such that the tension at the time of drawing is held within the favorable tension range of 0.05 to 0.20 N, an optical fiber having favorable transmission characteristics over the whole length thereof can be obtained.

Alternatively, the method of making an optical fiber in accordance with the present invention comprises preparing an optical fiber preform comprising a core region, and a cladding region, provided at an outer periphery of the core region, having one or a plurality of cladding layers doped with fluorine which lowers a refractive index, in which the outermost cladding layer of the one or plurality of cladding layers is configured such that fluorine successively lowers the doping amount thereof in an outer peripheral part including an outer periphery thereof to a predetermined doping amount which is the minimum doping amount of fluorine within the layer; and, when drawing the optical fiber preform upon heating, causing a heating furnace disposed downstream a drawing furnace to heat the optical fiber drawn by the drawing furnace to a temperature within a predetermined temperature range.

Thus, while the structure mentioned above suppresses the stress concentration and reduces the transmission loss, annealing the optical fiber by using the heating furnace disposed downstream the drawing furnace upon heating lowers the fictive temperature Tf within the optical fiber, which makes it possible to reduce the Rayleigh scattering loss.

When a resin coating section for coating the drawn optical fiber with a resin exists in the above-mentioned methods of making an optical fiber, it is preferred that the heating furnace disposed downstream the drawing furnace be located between the drawing furnace and the resin coating section.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
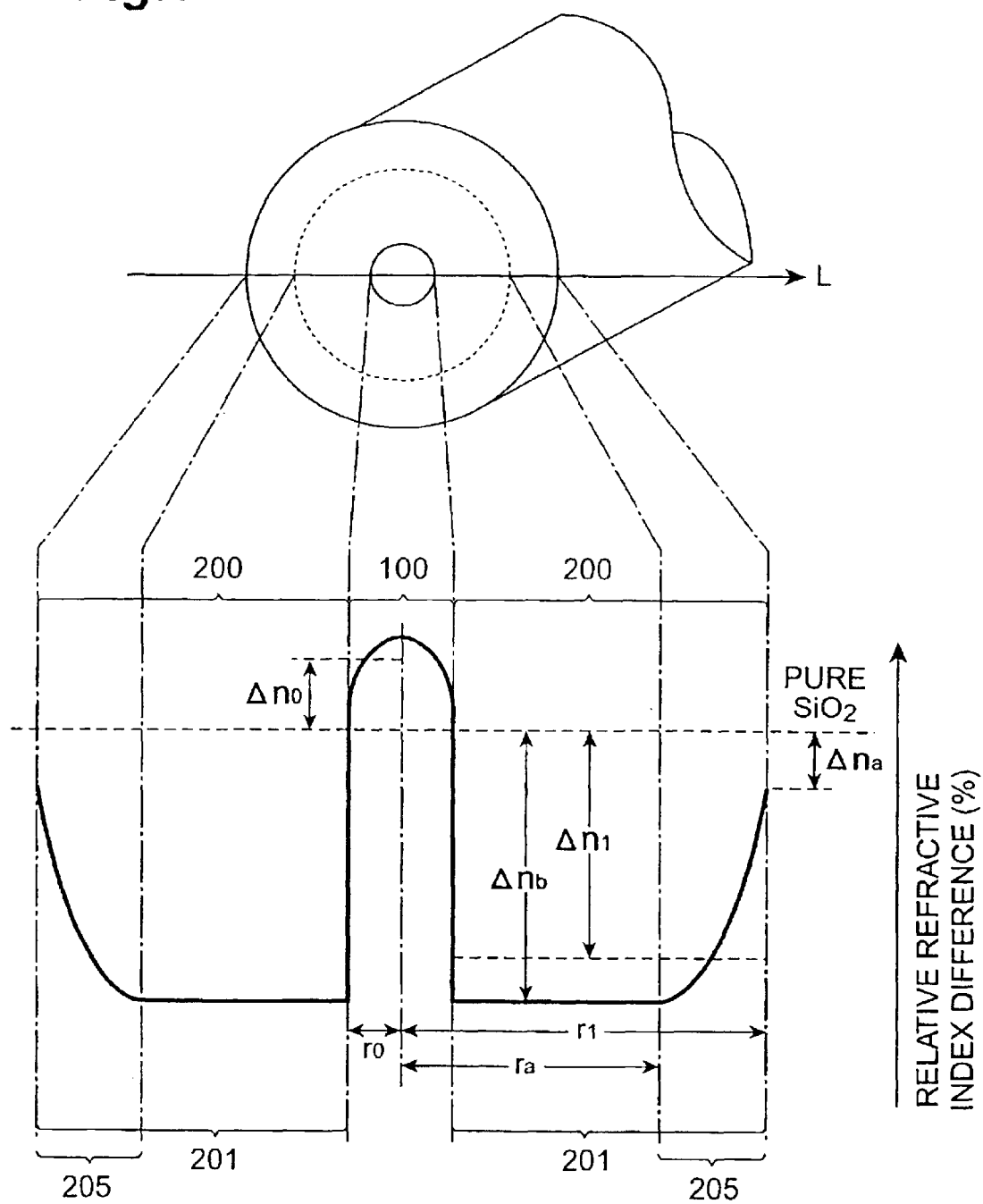
FIG. 1 is a view schematically showing the cross-sectional structure and refractive index profile of a first embodiment of the optical fiber.

In the following, preferred embodiments of the optical fiber, method of making an optical fiber preform, and method of making an optical fiber in accordance with the present invention will be explained in detail with reference to the drawings. In the explanation of the drawings, constituents identical to each other will be referred to with numerals or letters identical to each other without repeating their overlapping descriptions. Also, ratios of sizes in the drawings do not always correspond to those explained.

In the following, the relative refractive index difference indicating the value of refractive index in each part is assumed to be defined by the refractive index difference from pure $SiO_2$ (pure silica) expressed in terms of % while the refractive index in pure $SiO_2$ is taken as a reference (relative refractive index difference=0). The average doping amount of F or average relative refractive index difference in each region or each layer is defined by the value averaging the F doping amounts or relative refractive index differences weighted according to their corresponding areas within the region (within the layer)

First, the configuration of the optical fiber will be explained. FIG. 1 is a view schematically showing the cross-sectional structure of a first embodiment of the optical fiber in accordance with the present invention, and its refractive index profile in the fiber diameter direction (direction indicated by the line L in the drawing). Though different in scale, the abscissa of the refractive index profile (relative refractive index difference distribution) shown in FIG. 1 corresponds to individual positions in a cross section, perpendicular to the center axis of the optical fiber, extending along the line L shown in the cross-sectional structure in the drawing.

This optical fiber is an optical fiber of $SiO_2$ glass (silica glass) type; and comprises a core region 100 including the center axis of the optical fiber, and a cladding region 200 provided at the outer periphery of the core region 100. In such a configuration, the light transmitted through the optical fiber is transmitted through the core region 100 and the part of cladding region 200 on the inner periphery side thereof near the core region 100.

The core region 100 is formed such that its outer periphery has a radius of $r_0$. In the core region 100, pure $SiO_2$ glass is doped with a predetermined amount of Cl (chlorine) as an additive for raising the refractive index. As a consequence, the average relative refractive index difference within the core region 100 is $\Delta n_0$ (where $\Delta n_0 > 0$). In this embodiment, as shown in FIG. 1, the core region 100 is formed so as to have a graded refractive index distribution in which the doping amount of Cl and relative refractive index difference are maximized near the center axis of the optical fiber.

On the other hand, in this embodiment, the cladding region 200 is configured so as to have a single cladding layer 201. The cladding layer 201 is formed such that its outer periphery has a radius of $r_1$. In the cladding layer 201, pure $SiO_2$ glass is doped with a predetermined amount of F (fluorine) as an additive for lowering the refractive index. As a consequence, the average relative refractive index difference within the cladding layer 201 is $\Delta n_1$ (where $\Delta n_1 < 0$).

In the configuration of this embodiment, the cladding layer 201 is the outermost cladding layer within the cladding region 200. In its region including the outer periphery (the part located at the radius of $r_1$), a regional area whose radius ranges from $r_a$ to $r_1$ (where $r_0 < r_a < r_1$) is defined as an outer peripheral part 205, which is configured such that the F doping amount and relative refractive index difference attain a predetermined distribution therewithin.

Namely, in the cladding layer 201, which is the outermost cladding layer, the regional area whose radius ranges from $r_0$ to $r_a$ on the inside of the outer peripheral part 205 is doped with a substantially constant amount of F which is the maximum doping amount of F within the cladding layer. As a consequence, the part on the inside of the outer peripheral part 205 attains a relative refractive index difference of $\Delta n_b$, which is the minimum relative refractive index difference of F (corresponding to the maximum F doping amount and having the maximum absolute value) within the layer.

On the other hand, the outer peripheral part 205 is doped with F such that the F doping amount successively decreases from the inner side to the outer side from the above-mentioned maximum doping amount of F to a predetermined doping amount which is the minimum F doping amount within the layer. As a consequence, the outer peripheral part 205 is configured such that its relative refractive index difference changes from the inner side to the outer side from the above-mentioned minimal relative refractive index difference of $\Delta n_b$ to $\Delta n_a$, which is the maximum relative refractive index difference (corresponding to the minimum F doping amount and having the minimum absolute value) within the layer.

In the optical fiber of this embodiment, as mentioned above, the F doping amount distribution within the cladding layer 201 acting as the outermost cladding layer of the cladding region 200 is configured such that the F doping amount in its outer peripheral part 205 gradually decreases as shown in FIG. 1.

The core region 100 of this optical fiber is made of Cl-doped $SiO_2$ core. Though slightly lowered by the Cl doping, the viscosity of the core region 100 is higher than that of the cladding region 200 due to the doping amount and the like. Therefore, if the cladding layer 201 has a normal configuration which is doped with a substantially constant doping amount of F, the stress is concentrated into the core in excess.

When the F doping amount is lowered in the outer peripheral part 205 of the cladding layer 201 as mentioned above, by contrast, the viscosity of the outer peripheral part 205 becomes higher, so that the stress is dispersed into the outer peripheral part 205, whereby the stress concentration into the core is suppressed.

Since the stress concentration into the core is suppressed as such, the favorable tension range permitted at the time of drawing the optical fiber becomes wider, thereby facilitating the tension control at the time of drawing. Also, the stress is prevented from being concentrated into the core in excess, and the increase in transmission loss and the deterioration in transmission characteristics due to insufficient tension control and the like are kept from occurring, whereby an optical fiber having stable transmission characteristics over the whole length thereof is realized.

Preferably, concerning the minimum relative refractive index difference $\Delta n_b$ in the part on the inside of the outer peripheral part 205 and the maximum relative refractive index difference $\Delta n_a$ in the vicinity of the outer periphery of the outer peripheral part 205, the relative refractive index difference $\Delta n_a$ is higher than $\Delta n_b$ by at least 0.05% ($\Delta n_a \geq \Delta n_b + 0.05\%$). More preferably, the former is higher than the latter by at least 0.1% ($\Delta n_a \geq \Delta n_b + 0.1\%$).

When the amount of decrease in F doping amount in the outer peripheral part 205 of the cladding layer 201 is at least 0.05% or at least 0.1%, in terms of the relative refractive index difference, the viscosity in the vicinity of the outer periphery of the outer peripheral part 205 can be made on a par with that of the core region 100, for example, whereby the effect of dispersing the stress into the outer peripheral part 205 can fully be improved.

Concerning the doping of the core region 100 with Cl, it is preferred that the average relative refractive index difference fall within the range of $0.01\% \leq \Delta n_0 \leq 0.12\%$ in order to fully secure the effect of confining light into the core region 100, and the like. Since this Cl doping is less influential in transmission loss and the like, the Cl-doped core can be handled similarly to the pure $SiO_2$ core. The Cl doping is also effective in lowering the viscosity of the core region 100. The core region 100 may have a graded refractive index distribution as shown in FIG. 1, or a substantially constant refractive index distribution therewithin.

For suppressing the stress concentration into the core or reducing the transmission loss due to the facilitation of the tension control at the time of manufacture (at the time of drawing), it is specifically preferred that the Rayleigh scattering coefficient A be 0.81 dB/km·μm$^4$ or less, or the transmission loss $\alpha_{1.00}$ at a wavelength of 1.00 μm be 0.82 dB/km or less.

In an optical fiber with a pure $SiO_2$ core (or a Cl-doped $SiO_2$ core similar to the pure $SiO_2$ core) having a normal configuration, the Rayleigh scattering coefficient A and the transmission loss $\alpha_{1.00}$ are about 0.85 dB/km·μm$^4$ and 0.86 dB/km (reference values), respectively. By contrast, the optical fiber in accordance with this embodiment can make the Rayleigh scattering coefficient A and the transmission loss $\alpha_{1.00}$ fall within their respective ranges mentioned above, which are reduced by about 5% from their respective reference values.

Such a reduction in the Rayleigh scattering coefficient A or the transmission loss $\alpha_{1.00}$ is realized by the above-mentioned configuration of the optical fiber, or a combination of this configuration and a manufacturing method which can reduce the transmission loss caused by Rayleigh scattering loss and the like. The reduction in transmission loss effected by the manufacturing method will be explained later.

The Rayleigh scattering coefficient A will be explained here. The Rayleigh scattering coefficient A is an amount which acts as an index of the Rayleigh scattering loss included in the transmission loss of the optical fiber. In general, the transmission loss $\alpha_\lambda$ (dB/km) of the optical fiber at a wavelength λ is represented by the following expression:

$$\alpha_\lambda = A/\lambda^4 + B + C(\lambda)$$

according to the Rayleigh scattering loss and other transmission loss components such as structural asymmetry loss. In this expression, the first term, $A/\lambda^4$ (dB/km), indicates the Rayleigh scattering loss, and its coefficient A is the Rayleigh scattering coefficient (dB/km·μm$^4$). As can be seen from the above expression, the Rayleigh scattering loss is in proportion to the Rayleigh scattering coefficient A, whereby Rayleigh scattering coefficient A can be used as an index of the reduction in Rayleigh scattering loss. In view of the above-mentioned expression, the Rayleigh scattering coefficient A can be determined from data concerning the dependence of transmission loss (e.g., the gradient in a $1/\lambda^4$ plot) upon wavelength.

As for the transmission loss in the optical fiber of the present invention, a numeric range is given to the transmission loss $\alpha_{1.00}$ at a wavelength of 1.00 μm in the condition mentioned above. This is because of the fact that the value of transmission loss at a wavelength of 1.00 μm is greater than that in the 1.55-μm band used for optical transmission or the like and can be evaluated with a sufficient accuracy in a relatively short optical fiber sample having a length of about 1 to 10 km.

Also, the transmission loss $\alpha_{1.00}$ at a wavelength of 1.00 μm and the transmission loss $\alpha_{1.55}$ at a wavelength of 1.55 μm correspond to each other with a predetermined relationship therebetween. Therefore, if the transmission loss $\alpha_{1.00}$ is reduced, then the reduction can similarly be seen concerning the transmission loss $\alpha_{1.55}$. Specifically, from the above-mentioned expression, transmission losses $\alpha_{1.00}$ and $\alpha_{1.55}$ become $$\alpha_{1.00} = A + B + C(1.00), \text{ and}$$

$$\alpha_{1.55} = A \times 0.17325 + B + C(1.55),$$

thereby yielding the relationship of $$\alpha_{1.00} = \alpha_{1.55} + A \times 0.82675 + C(1.00) - C(1.55)$$

therebetween.

Figure 2:
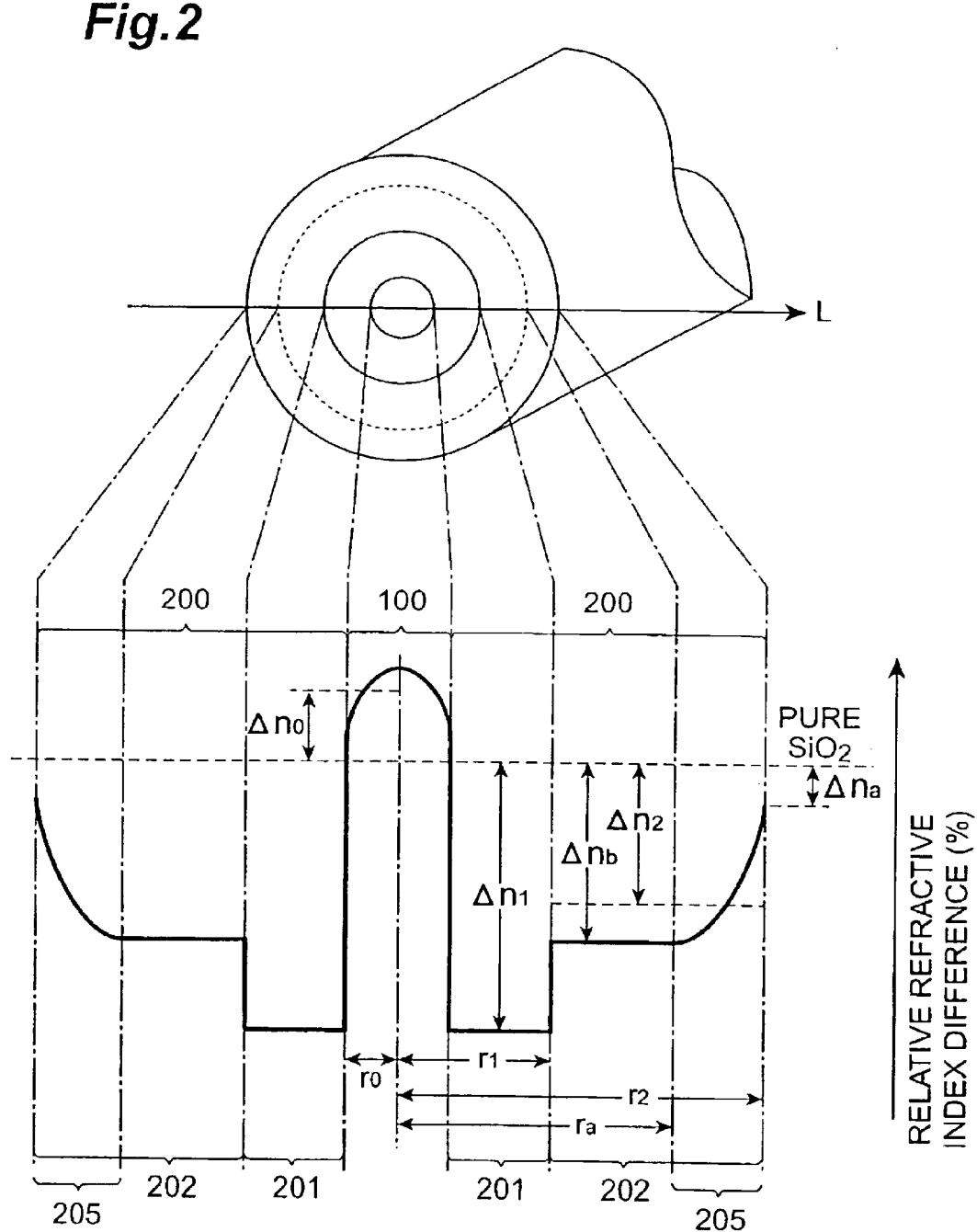
FIG. 2 is a view schematically showing the cross-sectional structure and refractive index profile of a second embodiment of the optical fiber.

FIG. 2 is a view schematically showing the cross-sectional structure of a second embodiment of the optical fiber in accordance with the present invention, and its refractive index profile in the fiber diameter direction.

As in the first embodiment, this optical fiber is an optical fiber of $SiO_2$ glass (silica glass) type; and comprises a core region 100 including the center axis of the optical fiber, and a cladding region 200 provided at the outer periphery of the core region 100. Here, the configuration of the core region 100 is substantially the same as that of the core region 100 in the optical fiber shown in FIG. 1.

On the other hand, the cladding region 200 in this embodiment comprises two layers of cladding, i.e., an inner cladding layer 201 provided at the outer periphery of the core region 100 and an outer cladding layer 202 further provided at the outer periphery of the inner cladding layer 201.

The inner cladding layer 201 is formed such that its outer periphery has a radius of $r_1$. In the inner cladding layer 201, pure $SiO_2$ glass is doped with a predetermined amount of F (fluorine) as an additive for lowering the refractive index. As a consequence, the average relative refractive index difference within the inner cladding layer 201 is $\Delta n_1$ (where $\Delta n_1<0$).

The outer cladding layer 202 is formed such that its outer periphery has a radius of $r_2$. In the outer cladding layer 202, pure $SiO_2$ glass is doped with a predetermined amount of F (fluorine). As a consequence, the average relative refractive index difference within the outer cladding layer 202 is $\Delta n_2$ (where $\Delta n_2<0$). However, the average F doping amount in the outer cladding layer 202 is smaller than that in the inner cladding layer 201, whereby the average relative refractive index differences of cladding regions 201 and 202 have a relationship of $0>\Delta n_2>\Delta n_1$.

Also, in the configuration of this embodiment, the outer cladding layer 202 is the outermost cladding layer in the cladding region 200. In its region including the outer periphery, a regional area whose radius ranges from $r_a$ to $r_2$ (where $r_1<r_a<r_2$) is defined as an outer peripheral part 205, which is configured such that the F doping amount and relative refractive index difference attain a predetermined distribution therewithin.

Namely, in the outer cladding layer 202, which is the outermost cladding layer, the regional area whose radius ranges from $r_1$ to $r_a$ on the inside of the outer peripheral part 205 is doped with a substantially constant amount of F which is the maximum doping amount of F. As a consequence, the part on the inside of the outer peripheral part 205 attains a relative refractive index difference of $\Delta n_b$, which is the minimum relative refractive index difference within the layer.

On the other hand, the outer peripheral part 205 is doped with F such that the F doping amount successively decreases from the inner side to the outer side from the above-mentioned maximum doping amount of F to a predetermined doping amount which is the minimum F doping amount within the layer. As a consequence, the outer peripheral part 205 is configured such that its relative refractive index difference changes from the inner side to the outer side from the above-mentioned minimal relative refractive index difference of $\Delta n_b$ to $\Delta n_a$, which is the maximum relative refractive index difference.

In the optical fiber of this embodiment, as in the first embodiment, the F doping amount distribution within the outer cladding layer 202 acting as the outermost layer of the cladding region 200 is configured such that the F doping amount in its outer peripheral part 205 gradually decreases. Therefore, the viscosity of the outer peripheral part 205 increases so much that the stress is dispersed into the outer peripheral part 205, whereby the stress concentration into the core is suppressed.

Since the stress concentration into the core is suppressed as such, the favorable tension range permitted at the time of drawing the optical fiber becomes wider, thereby facilitating the tension control at the time of drawing. Also, the stress is prevented from being concentrated into the core in excess, and the increase in transmission loss and the deterioration in transmission characteristics due to insufficient tension control and the like are kept from occurring, whereby an optical fiber having stable transmission characteristics over the whole length thereof is realized.

While the cladding region 200 in the optical fiber of the first embodiment is constituted by a single cladding layer 201, the cladding region 200 in the optical fiber of the second embodiment comprises two layers, i.e., the inner cladding layer 201 having a greater F doping amount (smaller relative refractive index difference) and the outer cladding layer 202 having a smaller F doping amount (greater relative refractive index difference).

In the cladding region 200 having such a two-layer structure, the inner cladding layer 201 positioned at the outer periphery of the core region 100 can efficiently confine the transmitted light into the core region 100 and its vicinity. On the other hand, the outer cladding layer 202 is effective in adjusting transmission characteristics of the optical fiber, reducing the stress concentration into the core, and so forth. The configurations of the outer cladding layer 202 and the outer peripheral part 205 therewithin can reliably suppress the stress concentration into the core region 100.

Preferably, for fully obtaining the effect of suppressing the stress concentration into the core region 100, the average relative refractive index difference $\Delta n_2$ of the outer cladding layer 202 is set so as to satisfy $\Delta n_2 \geq -0.26\%$. More preferably, it is set so as to satisfy $\Delta n_2 \geq -0.22\%$.

Figure 3:
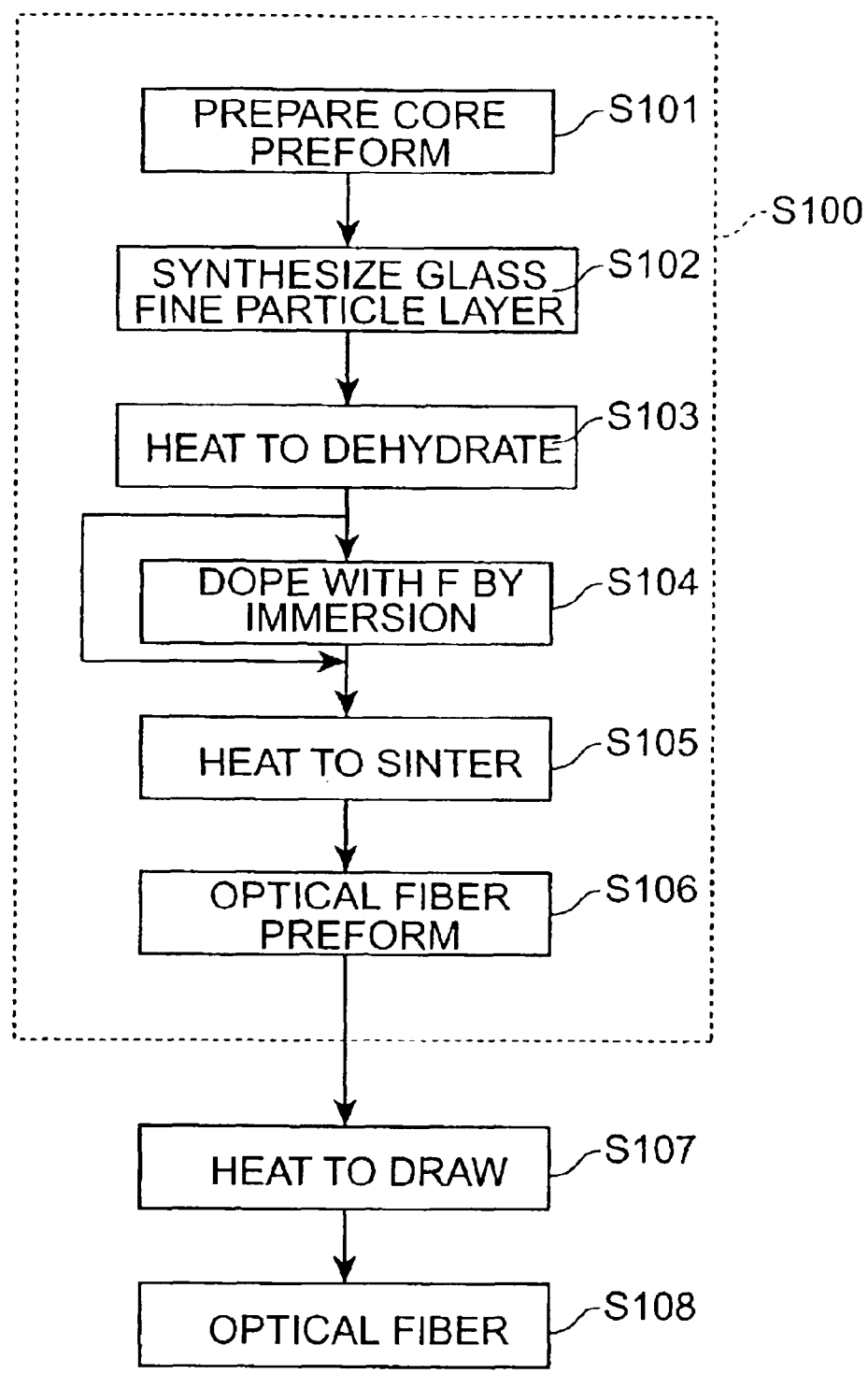
FIG. 3 is a flowchart schematically showing the method of making an optical fiber.

Methods of making an optical fiber preform and an optical fiber will now be explained. FIG. 3 is a flowchart schematically showing a method of making an optical fiber including a method of making an optical fiber preform, by which the optical fiber preform and optical fiber having the above-mentioned configuration are obtained.

In the manufacturing method shown in FIG. 3, an optical fiber preform having a configuration in which the F doping amount successively decreases (the relative refractive index difference successively increases) within the outer peripheral part 205 of the outermost cladding layer to a predetermined doping amount which is the minimum doping amount of F within the outermost cladding layer, as exemplified by the optical fibers in accordance with the first and second embodiments, is prepared (step S100 including steps S101 to S106). Then, thus obtained optical fiber preform is drawn upon heating (S107), so as to yield an optical fiber configured as shown in FIGS. 1 and 2 (S108).

First, the preparation of the optical fiber preform (S100) will be explained. Initially, a core preform including at least a core region is prepared (S101). As the core preform, a conventional core preform can be used. For example, a preform formed with a core region or further with a part of a cladding region and extended to a predetermined length can be used. The core region can be a pure $SiO_2$ core or a Cl-doped $SiO_2$ core, for example.

When forming the core preform (extended core body) with a part of the cladding region in a configuration having a single cladding layer 201 as in FIG. 1, there is a method forming a part thereof from the core preform. In this case, however, it is necessary that the core preform be free of at least a regional area including the outer peripheral part 205. In a configuration having two cladding layers 201, 202 as in FIG. 2, there is a method forming the inner cladding layer 201 from the core preform. The part of cladding region formed in the core preform may be formed by synthesis, dehydration, and consolidating as in the outermost cladding layer, which will be explained later, or by a rod-in-collapse method.

With respect to such a core preform, a synthesizing method such as VAD method or OVD method is used so as to synthesize a glass fine particle layer on its outer periphery (S102; synthesizing step). Specifically, fine particles of glass are generated by a flame from a glass synthesizing burner to which a material gas having a predetermined gas composition is supplied, and these fine particles of glass are deposited on the outer periphery of the core preform, so as to synthesize the glass fine particle layer. This glass fine particle layer is a layer to become the outermost cladding layer (or a predetermined part of on the outer side of the outermost cladding layer including at least the outer peripheral part thereof) after consolidating upon heating.

Subsequently, thus synthesized glass fine particle layer is dehydrated upon heating (S103; dehydrating step), and thus dehydrated glass fine particle layer is consolidated upon heating (S105; consolidating step), so as to make an optical fiber preform having the outermost cladding layer formed from the glass fine particle layer (S106).

If necessary, the glass fine particle layer may be doped with F by immersion (S104; immersing step) at a step between the dehydrating step (S103) and the consolidating step (S105). In the immersing step, the atmosphere in the consolidating furnace is set to a gas atmosphere containing a predetermined concentration of F, and the glass fine particle layer is doped with F by immersion in this gas atmosphere.

In such a method of making an optical fiber preform, a method for yielding an F doping amount distribution configured such that the doping amount gradually decreases in the outer peripheral part of the glass fine particle layer (outermost cladding layer) as shown in FIGS. 1 and 2 is, for example, one in which the glass fine particle layer is doped with F before the glass fine particle layer is consolidated upon heating and then, after the doping, a part of thus added F is eliminated from the outer peripheral part of the glass fine particle layer (corresponding to the outer peripheral part of the outermost cladding layer) including the outer periphery thereof.

Specifically, for example, a glass fine particle layer made of $SiO_2$ is synthesized as a jacket layer (sooting; synthesizing step) on the outer periphery of the core preform. Thereafter, it is dehydrated by heating at 1200° C. in an $SiCl_4$ atmosphere (dehydrating step), and then is doped with F by immersion upon heating at 1200° C. in an $SiF_4$ atmosphere (immersing step).

Subsequently, the glass fine particle layer (glass fine particle body) is consolidated upon heating at 1500° C. (consolidating step). Here, F ($SiF_4$) is eliminated from the gas atmosphere employed at the time of consolidating upon heating or its concentration is set to a level (e.g., a minute concentration) lower than that at the time of immersion. In this case, a part of added F is eliminated from the outer peripheral part of the glass fine particle layer (outermost cladding layer) in contact with the above-mentioned gas atmosphere during consolidating upon heating, so as to form such a doping amount distribution that the F doping amount gradually decreases in the outer peripheral part.

A method in which a part of F in the outer peripheral part is thus eliminated after doping with F can eliminate F at the time of consolidating upon heating as in the above-mentioned example, thereby being able to yield such a doping amount distribution that the F doping amount gradually decreases in the outer peripheral part without adding a new step. Therefore, an optical fiber having the above-mentioned configuration can be obtained without raising the manufacturing cost.

Without depending on how F is added, such a method is similarly applicable to a case where F is added to the glass fine particle layer at the time of synthesis without immersion into F, for example. Also, without being restricted to a method in which F is eliminated in the consolidating step, the elimination of F can be realized by various methods utilizing combinations of setting temperature, gas composition, gas flow rate, processing time, and the like in each of the dehydrating step, immersing step, and consolidating step. Also, the setting of these conditions can adjust the amount of elimination of F, the gradient of decrease in the doping amount distribution, and the like.

Similarly employable as a method for yielding an F doping amount distribution in which the doping amount gradually decreases in the outer peripheral part in the glass fine particle layer (outermost cladding layer) is a method in which, without F being eliminated after doping, the F doping amount is gradually lowered at the time of doping the glass fine particle layer with F.

Specifically, when synthesizing the glass fine particle layer as a jacket layer on the outer periphery of the core preform (synthesizing step), for example, a material gas containing F is supplied to the glass synthesizing burner, so as to dope the depositing fine particles of glass with F. If the amount of F contained in the supplied material gas is lowered as the fine particles of glass are deposited at this time, a doping amount distribution having a configuration in which the F doping amount gradually decreases in the outer peripheral part can be formed.

After the glass fine particle layer is doped with Cl at the time of synthesis, Cl may be substituted by F. In this case, it will be sufficient if the amount of Cl contained in the material gas is similarly lowered.

Figure 4:
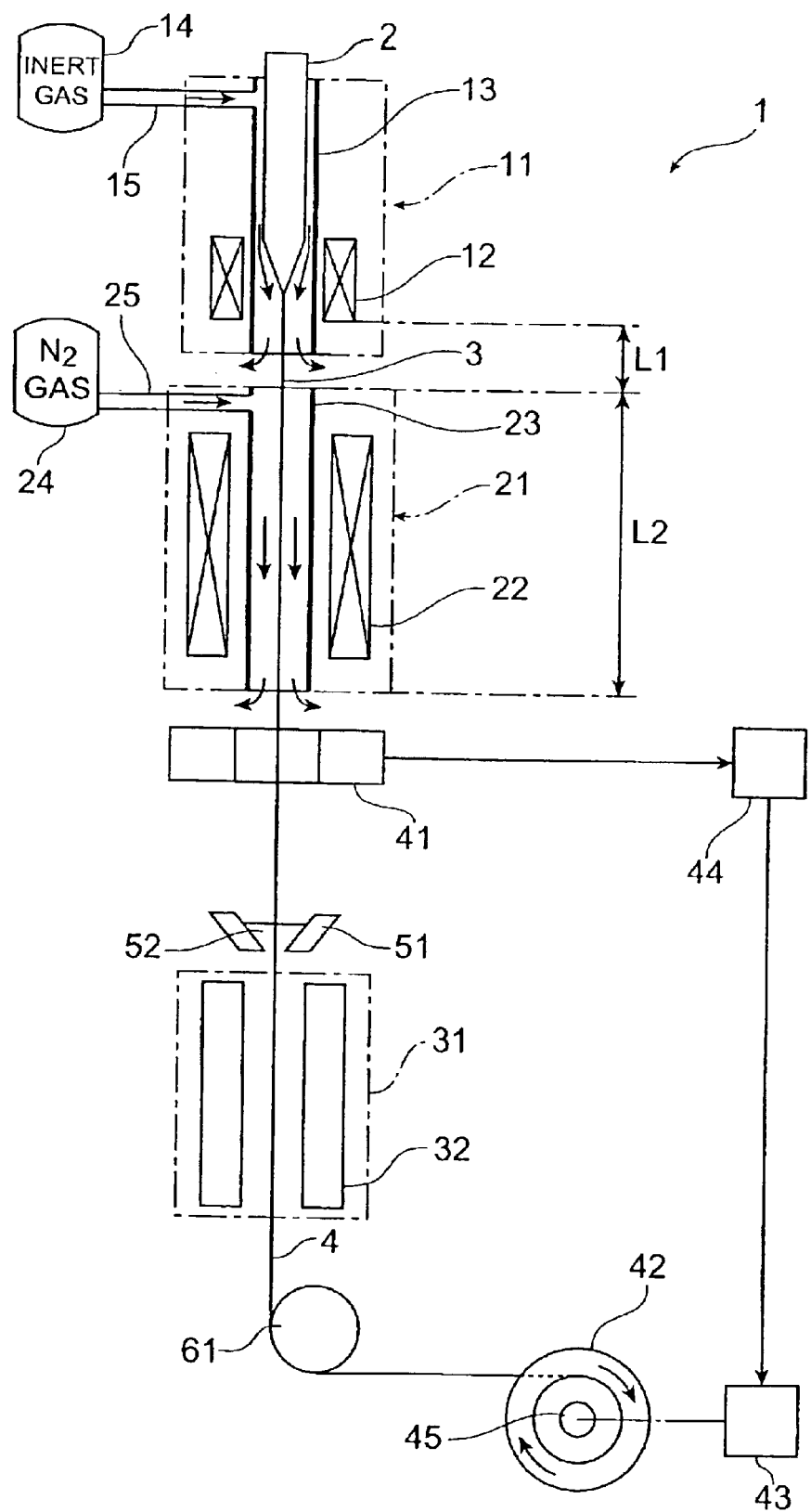
FIG. 4 is a view schematically showing the method of making an optical fiber, and an embodiment of the drawing apparatus used for making the optical fiber.

The drawing upon heating of thus prepared optical fiber preform (step S107 in FIG. 3) will now be explained. FIG. 4 is a diagram schematically showing a method of making an optical fiber in accordance with the present invention, and an embodiment of the drawing apparatus used for making the optical fiber.

The drawing apparatus 1 shown in FIG. 4 is a drawing apparatus for drawing a silica glass type optical fiber, and has a drawing furnace 11, a heating furnace 21 for annealing, and a resin curing unit 31. The drawing furnace 11, heating furnace 21, and resin curing unit 31 are successively arranged in this order in the direction of drawing an optical fiber preform 2 (in the direction from the upper side to the lower side in FIG. 4).

First, the optical fiber preform 2 held by a preform supply apparatus (not depicted) is supplied to the drawing furnace 11, the lower end of the optical fiber preform 2 is heated by a heater 12 within the drawing furnace 11 so as to soften, and an optical fiber 3 is drawn. An inert gas supply passage 15 from an inert gas supply unit 14 is connected to a muffle tube 13 of the drawing furnace 11, whereby an inert gas atmosphere is attained within the muffle tube 13 of the drawing furnace 11.

Here, employed as the optical fiber preform 2 supplied from the preform supply apparatus is one prepared such that the F doping amount successively decreases within the outer peripheral part of the outermost cladding layer to a predetermined doping amount which is the minimum doping amount of F within the outermost cladding layer as mentioned above.

The heated and drawn optical fiber 3 is drastically cooled to about 1700° C. by the inert gas within the muffle tube 13. Thereafter, the optical fiber 3 is taken out of the drawing furnace 11 from the lower part of the muffle tube 13, and is cooled with air between the drawing furnace 11 and the heating furnace 21. As the inert gas, $N_2$ gas can be used, for example. The heat conduction coefficient λ of $N_2$ gas (T=300 K) is 26 mW/(m·K). The heat conduction coefficient λ of air (T=300 K) is 26 mW/(m·K).

Subsequently, the air-cooled optical fiber 3 is fed to the heating furnace 21 for annealing disposed downstream the drawing furnace 11, and between the drawing furnace 11 and the resin curing unit 31. Then, a predetermined segment of the optical fiber 3 is heated so as to attain a temperature within a predetermined temperature range, and is annealed at a predetermined cooling rate. The heating furnace 21 has a muffle tube 23 through which the optical fiber 3 passes.

Preferably, the muffle tube 23 is set so as to have a total length L2 (m) satisfying $$L2 \geq V/8$$

in the drawing direction of the optical fiber preform 2 (the vertical direction in FIG. 4). Here, V is the drawing rate (m/s).

Preferably, the muffle tube 23 in the heating furnace 21 is set at a position where the temperature of the optical fiber 3 immediately before it enters the muffle tube 23 (entering temperature) falls within the range of 1400° C. to 1800° C., and $$L1 \leq 0.2 \times V$$

is satisfied with respect to the drawing furnace 11. Here, L1 is the distance (m) from the lower end of the heater 12 of the drawing furnace 11 to the upper end of the muffle tube 23, whereas V is the drawing rate (m/s). The temperature of the heater 22 in the heating furnace 21 is set such that the furnace center (part through which the optical fiber 3 passes) attains a temperature within the range of 1100° C. to 1600° C., preferably 1200° C. to 1600° C., 1250° C. to 1500° C. in particular, more preferably 1300° C. to 1500° C.

According to the above-mentioned settings of position and length of the heating furnace 21 (muffle tube 23), the heated and drawn optical fiber 3 is heated in the heating furnace 21 for annealing so as to attain a temperature within the range of 1100° C. to 1700° C., preferably 1200° C. to 1700° C. In particular, of the part attaining a temperature of 1100° C. to 1700° C. in the optical fiber 3, a segment where the optical fiber 3 yields a temperature difference of 50° C. or greater, e.g., a part where the temperature of the optical fiber 3 ranges from 1250° C. to 1500° C., more preferably from 1300° C. to 1500° C. (segment yielding a temperature difference of 200° C.), is annealed at a cooling rate of 1000° C./second or less.

When the furnace center is set to a temperature within the range of 1100° C. to 1600° C., preferably 1200° C. to 1600° C., a segment attaining a temperature difference of 50° C. or greater in the part of heated and drawn optical fiber 3 yielding a temperature of 1100° C. to 1700° C., preferably 1200° C. to 1700° C., is annealed at a cooling rate of 1000° C./second or less.

An $N_2$ gas supply passage 25 from an $N_2$ gas supply unit 24 is connected to the muffle tube 23 of the heating furnace 21, whereby an $N_2$ gas atmosphere is attained within the muffle tube 23 of the heating furnace 21. A gas having a relatively large molecular weight such as air or Ar and the like can also be used in place of $N_2$ gas. When a carbon heater is used, however, it is necessary to use an inert gas.

The outer diameter of the optical fiber 3 let out of the heating furnace 21 is measured online by an outer-diameter meter 41 acting as outer-diameter measuring means, and thus measured value is fed back to a driving motor 43 for driving a drum 42 to rotate, whereby the outer diameter is controlled so as to become constant. The output signal from the outer-diameter meter 41 is fed to a control unit 44 acting as control means, where the rotating speed of the drum 42 (driving motor 43) is determined by an arithmetic operation such that the outer diameter of the optical fiber 3 attains a predetermined value which has been set beforehand.

An output signal indicative of the rotating speed of the drum 42 (driving motor 43) determined by the arithmetic operation is outputted from the control unit 44 to a driving motor driver (not depicted), whereby the driving motor driver controls the rotational speed of the driving motor 43 according to the output signal from the control unit 44.

Thereafter, the optical fiber 3 is coated with a UV resin 52 by a coating die 51. The coated UV resin 52 is cured by a UV lamp 32 in the resin curing unit 31, whereby a coated optical fiber 4 is formed. Subsequently, by way of a guide roller 61, the coated optical fiber 4 is taken up by the drum 42. The drum 42 is supported by a rotary driving shaft 45, an end part of which is connected to the driving motor 43.

In this embodiment, the coating die 51 and the resin curing unit 31 constitute a resin coating section for coating the optical fiber with a resin. Without being restricted to the configuration mentioned above, the resin coating section may be configured such that the optical fiber is coated with a heat-curable resin, which is then cured by the heating furnace.

As mentioned above, the inert gas supply passage 15 from the inert gas supply unit 14 is connected to the muffle tube 13 of the drawing furnace 11, whereby an inert gas atmosphere is attained within the muffle tube 13 of the drawing furnace 11. However, an $N_2$ gas supply unit may be provided as the inert gas supply unit 14, so as to supply $N_2$ gas into the muffle tube 13 and attain an $N_2$ gas atmosphere.

In the case where the drawing rate is slow, e.g., 100 m/min, the optical fiber 3 may be cooled to about 1000° C. within the drawing furnace 11 (muffle tube 13) in an He gas atmosphere. In this case, it is preferred that an $N_2$ gas atmosphere be provided within the muffle tube 13 so that the optical fiber 3 attains a temperature of about 1700° C. at the exit of the drawing furnace 11 (muffle tube 13). Also, an He gas supply unit and an $N_2$ gas supply unit maybe provided, so as to supply He gas or $N_2$ gas into the muffle tube 13 according to the drawing rate. In practice, structural relaxation is possible by reheating to 1100° C. to 1700° C., preferably 1200° C. to 1700° C., after temporary cooling. In this case, however, heater length loss occurs upon reheating.

Employed as the optical fiber preform 2 in the above-mentioned method of making an optical fiber is an optical fiber preform prepared so as to have a configuration in which the F doping amount in the outer peripheral part of the outermost cladding layer successively decreases. The optical fiber preform and optical fiber having such a configuration suppresses the stress concentration into the core by dispersing the stress into the outer peripheral part. At this time, in the tension control with respect to the drawing upon heating in the drawing furnace 11, the tension range permitted for yielding a favorable optical fiber becomes wider, and the tension control is facilitated. Also, the optical fiber obtained after drawing can become an optical fiber excellent in its transmission loss and transmission characteristics (e.g., low transmission loss).

If the tension at the time of drawing deviates from the favorable tension range, the structural asymmetry loss will increase at a lower tension, whereas the Rayleigh scattering loss will increase at a higher tension, thereby causing the transmission loss of optical fiber to increase. The manufacturing method in which the tension control is facilitated as mentioned above, by contrast, lowers the dependence of transmission loss upon tension, thereby suppressing the increase in transmission loss caused by changes in tension and the deterioration in transmission characteristics other than the transmission loss and the like. Also, since no high accuracy is necessary for the tension control, the manufacturing step is facilitated, and its manufacturing yield improves. Preferably, the tension control is carried out such that the tension falls within the range from 0.05 to 0.20 N (5 to 20 gw).

As for the F doping amount distribution, since the region for lowering the F doping amount is the outer peripheral part of the outermost cladding layer, it does not influence transmission characteristics of light transmitted through the core region and its vicinity. Therefore, while favorably keeping transmission characteristics and the like of the optical fiber, the simplification of tension control can be achieved.

In the manufacturing method and drawing apparatus 1 shown in FIG. 4, after the optical fiber preform 2 is drawn, the optical fiber 3 is annealed by use of the heating furnace 21 for annealing disposed downstream the drawing furnace 11. As a consequence, the fictive temperature Tf within the optical fiber can be lowered, so as to reduce the Rayleigh scattering loss.

Even when a manufacturing method effective in reducing the Rayleigh scattering loss is employed as such, the transmission loss cannot always be reduced as a whole. This is assumed to be because of the fact that, while the Rayleigh scattering loss is reduced, the excessive concentration of stress into the core enhances other transmission loss components such as structural asymmetry loss, whereby the effect of reducing the transmission loss is not obtained as a whole. Also, there is a possibility that the effect of reducing the Rayleigh scattering loss is not fully obtained when the structural asymmetry loss and the like are to be restrained from occurring.

When the optical fiber preform and optical fiber configured as mentioned above such that the F doping amount decreases in the outer peripheral part of the outermost cladding layer are employed, by contrast, the Rayleigh scattering loss is reduced (e.g., such that the Rayleigh scattering coefficient A is 0.81 dB/km·$\mu$m$^4$ or less), and the occurrence of structural asymmetry loss and the like caused by the stress concentration into the core is suppressed at the same time, which makes it possible to realize an optical fiber having a low transmission loss (e.g., transmission loss $\alpha_{1.00}$ of 0.82 dB/km or less at a wavelength of 1.00 $\mu$m) as a whole.

Concerning the above-mentioned optical fiber and the method of making the same, specific examples and comparative examples will be shown. The optical fibers in the following examples and comparative examples were made by both of manufacturing methods with and without annealing in the heating furnace 21 shown in FIG. 4. The heating condition in the heating furnace 21 for annealing was set to a temperature of about 1300° C., a linear velocity of 25 m/min, and a furnace length of about 1.5 m.

The optical fiber to become the first example was made according to the refractive index profile shown in FIG. 1. The radii $r_0$, $r_a$, and $r_1$ were set such that $2r_0=10$ $\mu$m, $2r_a=110$ $\mu$m, and $2r_1=125$ $\mu$m, respectively.

As for the refractive indices in individual regions, the core region 100 was doped with Cl such that the average relative refractive index difference $\Delta n_0=+0.08\%$. On the other hand, the cladding layer 201 of the cladding region 200 was doped with F so as to yield such a doping amount distribution that the minimum relative refractive index difference $\Delta n_b=-0.35\%$, whereas the maximum relative refractive index difference $\Delta n_a=$about $-0.05\%$ in the outer peripheral part 205. Here, on average, $\Delta n_1=$about $-0.28\%$.

The optical fiber to become the second example was made according to the refractive index profile shown in FIG. 2. The radii $r_0$, $r_1$, $r_a$, and $r_2$ were set such that $2r_0=10$ $\mu$m, $2r_1=55$ $\mu$m, $2r_a=110$ $\mu$m, and $2r_2=125$ $\mu$m, respectively.

As for the refractive indices in individual regions, the core region 100 was doped with Cl such that the average relative refractive index difference $\Delta n_0=+0.08\%$. On the other hand, the inner cladding layer 201 of the cladding region 200 was doped with F such that the average relative refractive index difference $\Delta n_1=-0.28\%$. The outer cladding layer 202 was doped with F, while the amount of SiF$_4$ in the F immersing step was reduced to 1/3, so as to yield such a doping amount distribution that the minimum relative refractive index difference $\Delta n_b=-0.20\%$, whereas the maximum relative refractive index difference $\Delta n_a=$about $-0.05\%$ in the outer peripheral part 205.

Further, as the third example of the optical fiber, the optical fiber having the same configuration as that of the second example was made while the heating condition in the heating furnace for annealing was set to a temperature of 1100° C.

Figure 5:
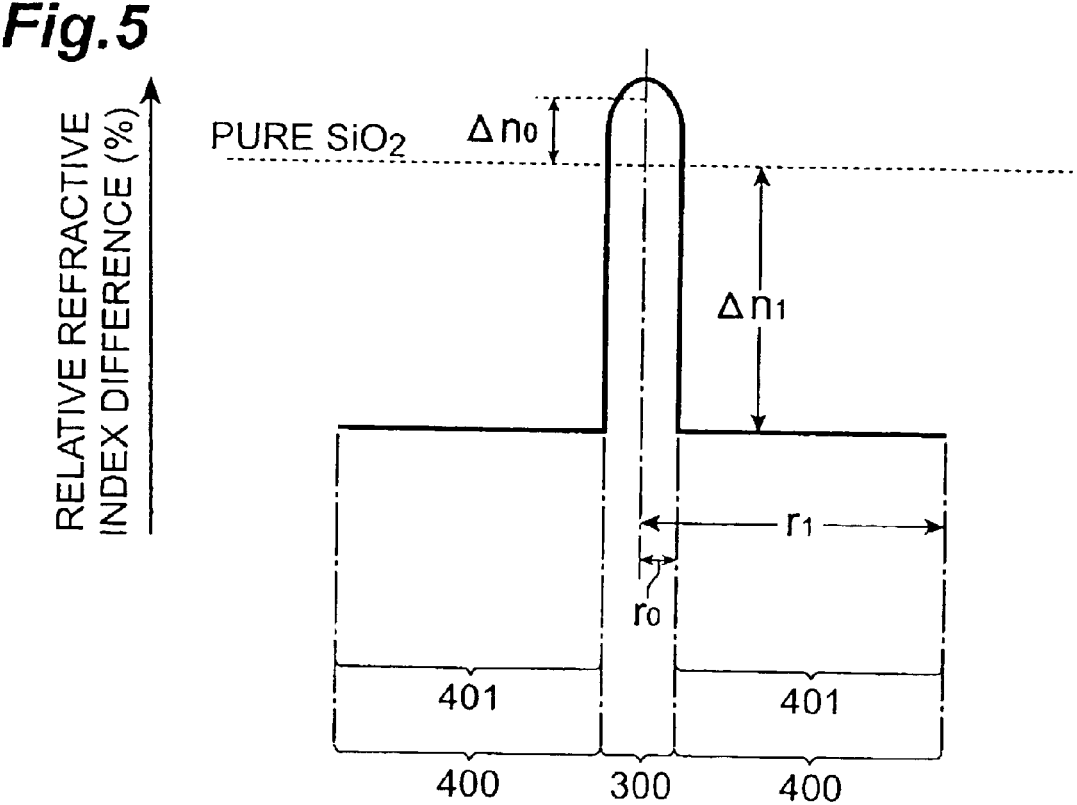
FIG. 5 is a chart showing the refractive index profile in a first comparative example of the optical fiber.

FIG. 5 is a chart showing the refractive index profile of the first comparative example of the optical fiber. The configuration of the optical fiber in accordance with this comparative example is the same as that of the above-mentioned first example except that no outer peripheral part in which the F doping amount decreases is formed. The radii $r_0$ and $r_1$ of its core region 300 and cladding layer 401 in its cladding region 400 were such that $2r_0=10$ $\mu$m, and $2r_1=125$ $\mu$m, respectively.

As for the refractive indices in individual regions, the core region 300 was doped with Cl such that the average relative refractive index difference $\Delta n_0=+0.08\%$. On the other hand, the cladding layer 401 of the cladding region 400 was doped with F such that the average relative refractive index difference $\Delta n_1=-0.35\%$.

Figure 6:
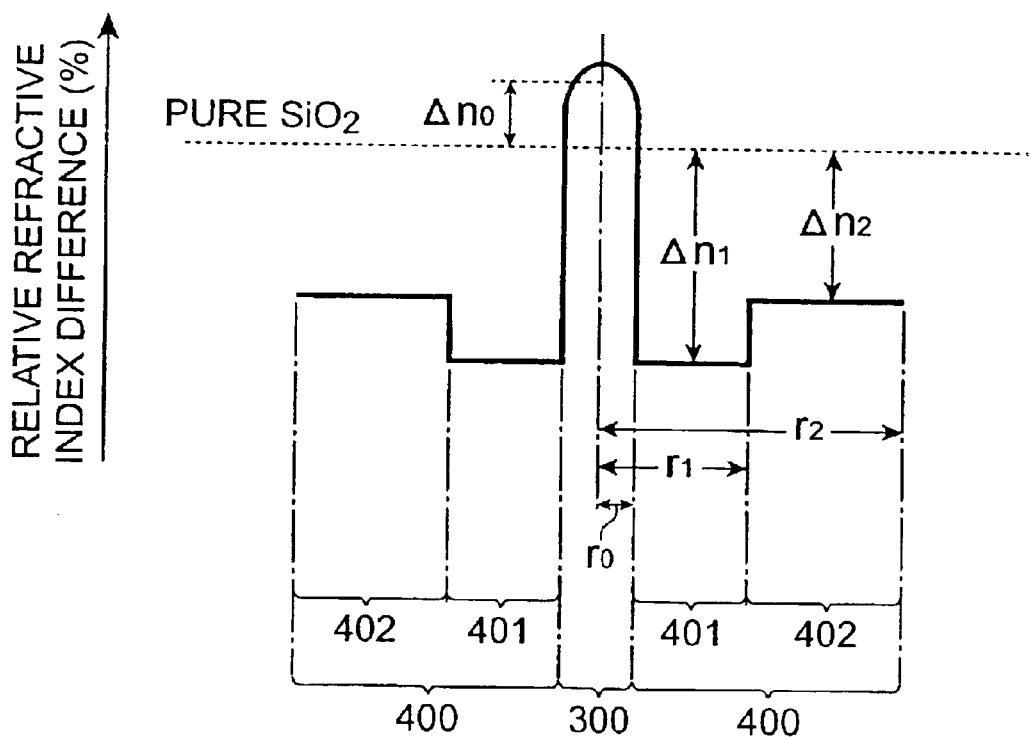
FIG. 6 is a chart showing the refractive index profile in a second comparative example of the optical fiber.

FIG. 6 is a chart showing the refractive index profile of the second comparative example of the optical fiber. The configuration of the optical fiber in accordance with this comparative example is the same as that of the above-mentioned second example except that no outer peripheral part in which the F doping amount decreases is formed. The radii $r_0$, $r_1$ and $r_2$ Of its core region 300 and inner and outer cladding layers 401 and 402 in its cladding region 400 were such that $2r_0=10$ $\mu$m, $2r_1=55$ $\mu$m, and $2r_2=125$ $\mu$m, respectively.

As for the refractive indices in individual regions, the core region 300 was doped with Cl such that the average relative refractive index difference $\Delta n_0=+0.08\%$. On the other hand, the inner cladding layer 401 of the cladding region 400 was doped with F such that the average relative refractive index difference $\Delta n_1=-0.28\%$. The outer cladding layer 402 was doped with F, while the amount of SiF$_4$ in the F immersing step was reduced to 1/3, such that the average relative refractive index difference $\Delta n_2=-0.20\%$.

Figure 7:
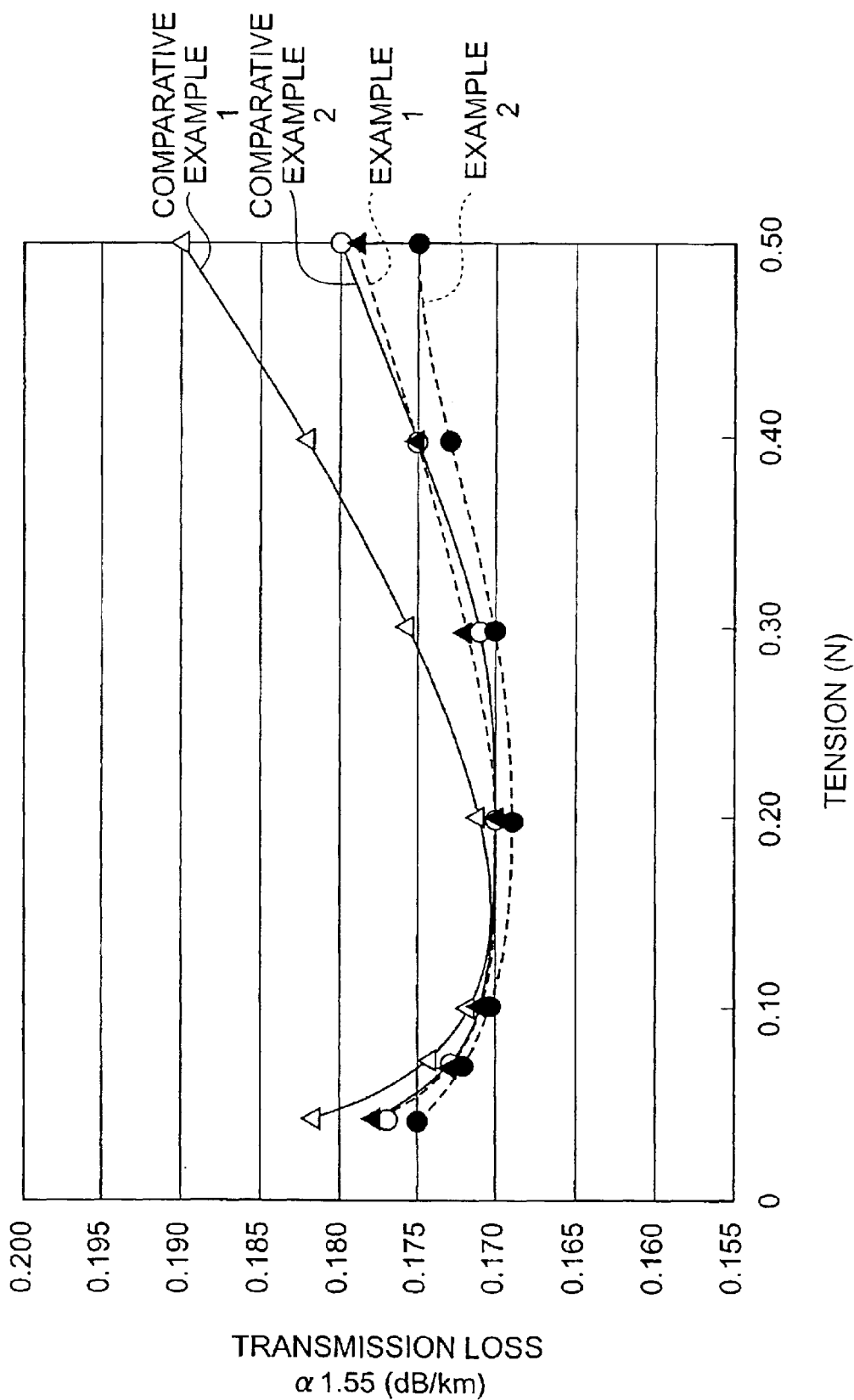
FIG. 7 is a graph showing the dependence of transmission loss upon tension in optical fibers.

FIG. 7 shows the dependence of the transmission loss 1.55 at a wavelength of 1.55 $\mu$m upon tension in the case where drawing was carried out by a manufacturing method without annealing by the heating furnace concerning the foregoing first and second examples and first and second comparative examples. It can be seen from this graph that, when the dependence of transmission loss $\alpha_{1.55}$ upon tension is compared between the first example and first comparative example in the configuration having a single cladding layer, and between the second example and second comparative example in the configuration having two cladding layers, the value of transmission loss is reduced and its dependence upon tension is lowered in the first and second examples provided with an outer peripheral part where the F doping amount decreases.

Figure 8:
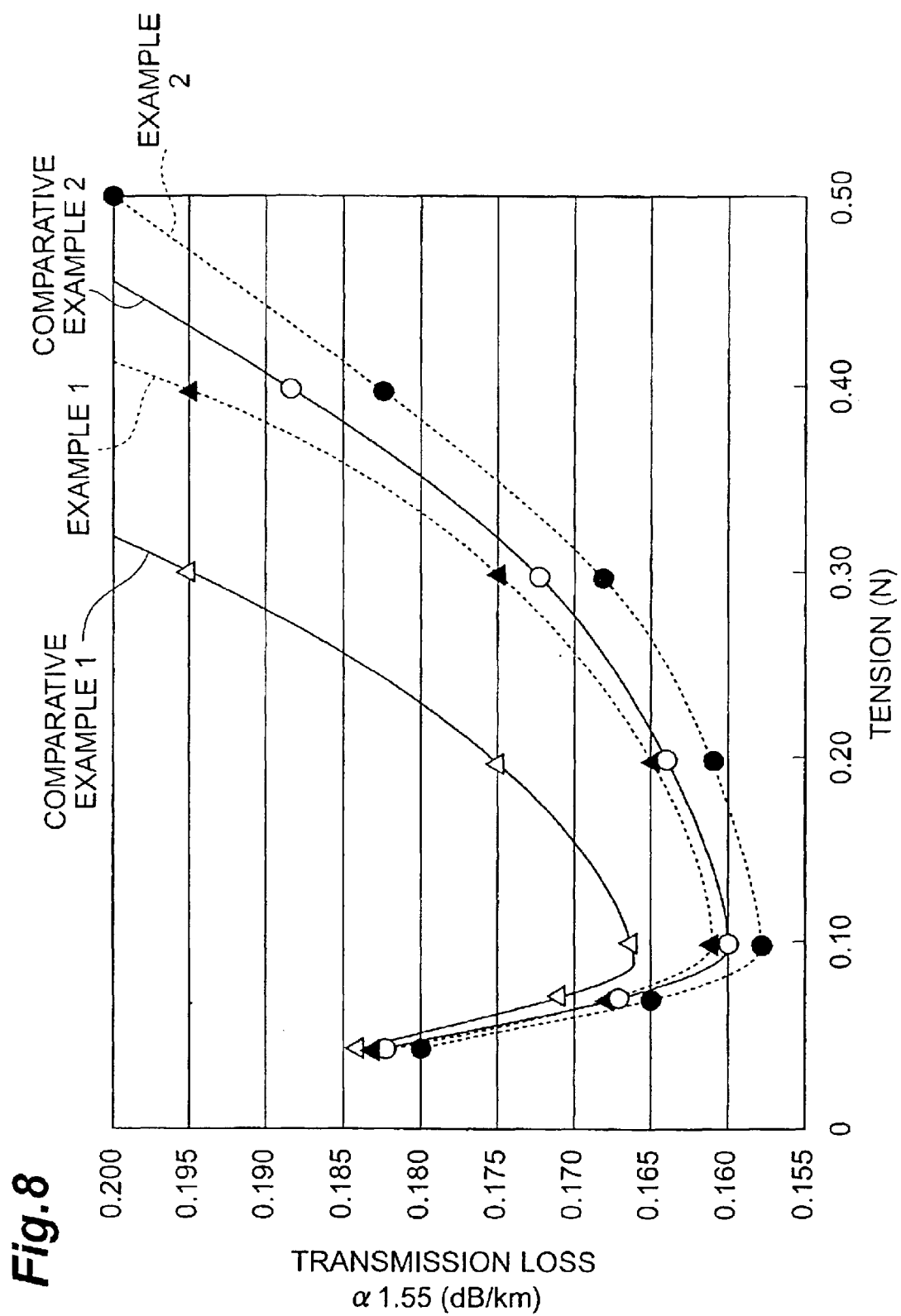
FIG. 8 is a graph showing the dependence of transmission loss upon tension in optical fibers.

FIG. 8 shows the dependence of the transmission loss $\alpha_{1.55}$ upon tension in the case where drawing was carried out by a manufacturing method with annealing by the heating furnace. It can be seen from this graph that, when the dependence of transmission loss $\alpha_{1.55}$ upon tension is compared between the first example and first comparative example in the configuration having a single cladding layer, and between the second example and second comparative example in the configuration having two cladding layers, the value of transmission loss is reduced and its dependence upon tension is lowered in the first and second examples provided with an outer peripheral part where the F doping amount decreases as in the case without annealing shown in FIG. 7.

When the values of transmission loss $\alpha_{1.55}$ at a tension of 0.10 N are compared in the case with annealing, for example, the first comparative example exhibits 0.166 dB/km, whereas the first example exhibits 0.161 dB/km, in the case of a single cladding layer. In the case of two cladding layers, the second comparative example exhibits 0.160 dB/km, whereas the second example exhibits 0.158 dB/km.

While the optical fiber was prepared at a tension of 0.10 N concerning the third example, the transmission loss $\alpha_{1.55}$ at this time was 0.162 dB/km.

In the graph of FIG. 8, the reduction of transmission loss $\alpha_{1.55}$ in the examples as compared with the comparative examples is greater than that in the graph of FIG. 7. This is assumed to be because of the annealing effect caused by the heating furnace.

Namely, even in the case with annealing, an optical fiber having a configuration with no outer peripheral part where the F doping amount is lowered reduces the Rayleigh scattering loss upon annealing, but increases the structural asymmetry loss due to the stress concentration into the core, whereby the transmission loss cannot fully be reduced as a whole. When an optical fiber is configured so as to be provided with an outer peripheral part where the F doping amount is lowered, while annealing is carried out, by contrast, the Rayleigh scattering loss is reduced, and the structural asymmetry loss is restrained from occurring due to the stress concentration into the core, whereby an optical fiber having a low transmission loss as a whole can be obtained.

When the first example having a single cladding layer and the second example having two cladding layers are compared with each other, the transmission loss is lower in the second example. This is because of the fact that the outer cladding layer on the outer side of the two cladding layers has a relatively smaller F doping amount, whereby the outer cladding layer itself has a stress dispersing function to a certain extent.

When the values of Rayleigh scattering coefficient A and transmission loss $\alpha_{1.00}$ at a wavelength of 1.00 μm were determined for each of the optical fibers in accordance with the first, second, and third examples at a tension of 0.10 N, each case was seen to exhibit a Rayleigh scattering loss A of 0.81 dB/km·μm$^4$ or less and a transmission loss $\alpha_{1.00}$ of 0.82 dB/km or less.

In view of the foregoing, the configuration in which the F doping amount is lowered in the outer peripheral part of the outermost cladding layer suppresses the stress concentration into the core, thereby facilitating the tension control at the time of drawing and realizing an optical fiber in which the transmission loss is stably reduced over the whole length thereof.

In the case of the configuration having two cladding layers of the inner and outer cladding layers, one in which the F doping amount is made smaller in the outer cladding layer (outer cladding layer 202 shown in FIG. 2) as a whole can suppress the stress concentration into the core by dispersing the stress into the outer cladding layer. However, while the case where the total F doping amount in the outer cladding layer is lowered is effective in dispersing the stress, it influences transmission characteristics of the optical fiber.

Figure 9:
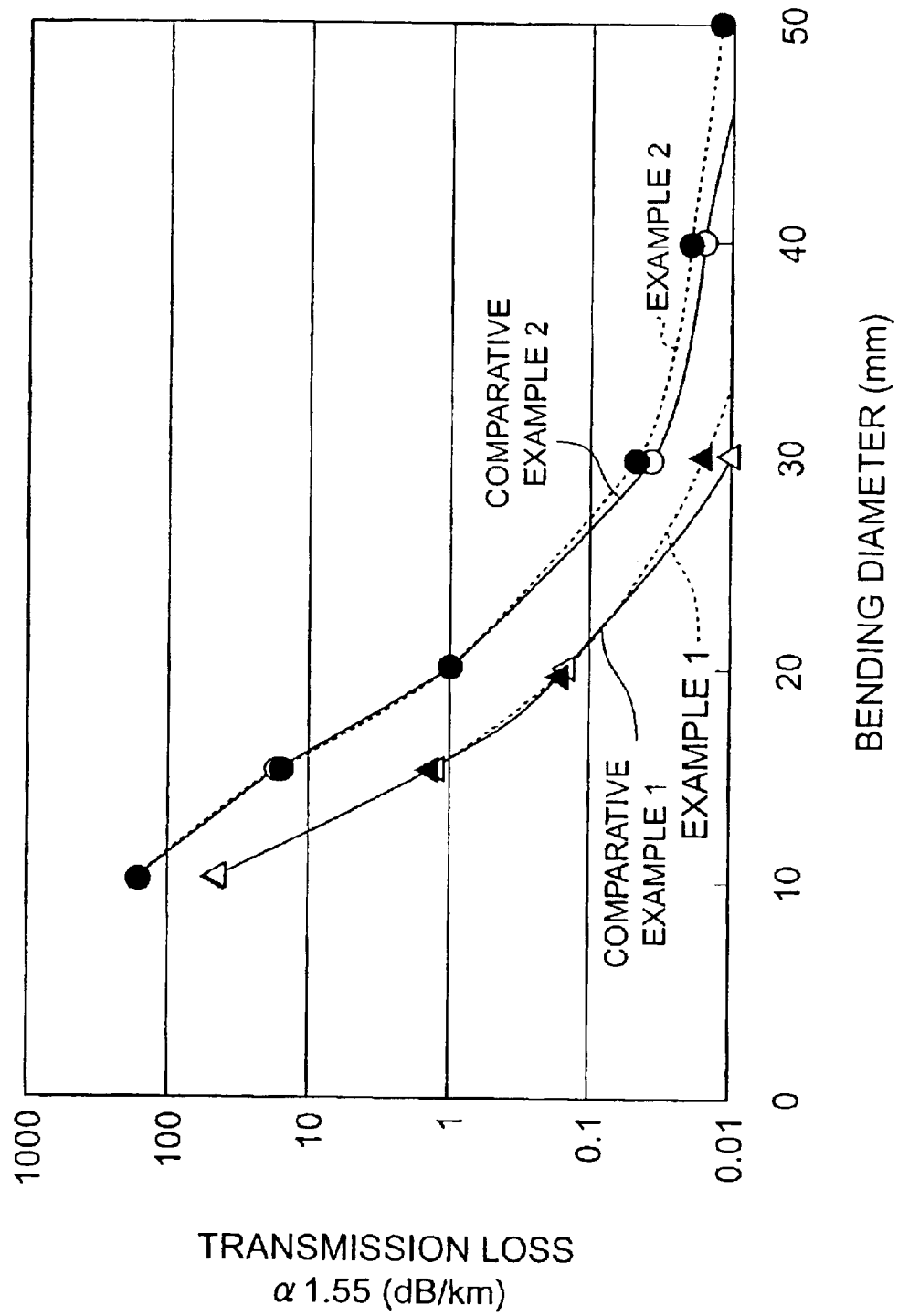
FIG. 9 is a graph showing the dependence of transmission loss upon bending diameter in optical fibers.

FIG. 9 shows results of determination of bending characteristics concerning the optical fibers in accordance with the examples and comparative examples in the case without annealing. It can be seen from this graph that the value of bending loss greatly varies between the first example (or first comparative example) having a single cladding layer and the second example (or second comparative example) having two cladding layers.

When the first example and first comparative example (or the second example and second comparative example) having the same configuration except for the outer peripheral part are compared with each other, by contrast, their bending characteristics hardly vary therebetween. Similar tendencies are seen in the optical fibers of the examples and comparative examples in the case with annealing.

Namely, if the F doping amount is lowered in the cladding layer as a whole, the above-mentioned bending characteristics and other various characteristics such as cutoff wavelength and dispersion characteristics will change. By contrast, a configuration in which the F doping amount is lowered only in the outer peripheral part of the outermost cladding layer, the stress concentration into the core can efficiently be suppressed without deteriorating transmission characteristics of the optical fiber.

For the stress dispersion into the outer peripheral part of the cladding region, a layer having a high viscosity made of pure $SiO_2$ and the like can be formed on the outermost side of the cladding region (see, e.g., Japanese Patent Application Laid-Open No. SHO 64-87528 and No. HEI 2-113205), for example. However, such a configuration further necessitates synthesizing, dehydrating, and consolidating steps for forming a new pure $SiO_2$ layer as the outermost layer, thereby complicating the manufacturing process and raising the manufacturing cost.

By contrast, the configuration of the present invention in which a part having a high viscosity is formed within the outermost cladding layer by a doping amount distribution lowering the F doping amount only in an outer peripheral part of the outermost cladding layer can realize an optical fiber preform and optical fiber configured so as to suppress the stress concentration into the core without adding any new step to the manufacturing process.

Without being restricted to the above-mentioned embodiments and examples, the optical fiber, method of making an optical fiber preform, and method of making an optical fiber in accordance with the present invention can be subjected to various modifications and configurational changes. For example, the cladding region can use various configurations without being restricted to the configurational examples shown in FIGS. 1 and 2. Though the core region has a configuration doped with Cl in FIGS. 1 and 2, it may be a core made of pure $SiO_2$.

The F doping amount distribution in the outer peripheral part of the outermost cladding layer may differ from the configurations shown in FIGS. 1 and 2 depending on the manufacturing method and the like. For example, it may be configured such that the F doping amount is substantially constant at the minimum doping amount in a predetermined area on the outer periphery side within the outer peripheral part and changes on the inside thereof (on the inner periphery side within the outer peripheral part). When a region where the F doping amount is substantially constant at the minimum doping amount is thus provided in the vicinity of the outer periphery, which is an outer portion in the outer peripheral part, the viscosity within the region can be made higher, so that the stress dispersion into the outer peripheral part can be realized more efficiently.

In the outermost cladding layer such as the outer cladding layer, the F doping amount in the vicinity of its inner periphery may be smaller than the maximum F doping amount within the layer. When forming the outermost cladding layer, there is a case where the F doping amount slightly decreases in the vicinity of the inner periphery thereof. Even in the case of such a doping amount distribution, the above-mentioned optical fiber configuration can realize the stress dispersion into the outer peripheral part.

As explained in detail in the foregoing, the optical fiber, method of making an optical fiber preform, and method of making an optical fiber in accordance with the present invention yield the following effects. Namely, in the optical fiber comprising a core region and a cladding region provided at the outer periphery of the core region, the outermost cladding layer of the cladding region is configured such that the F doping amount within the outer peripheral part thereof successively decreases, whereby the viscosity in the outer peripheral part increases, so that the stress disperses into the outer peripheral part, thus suppressing the stress concentration into the core.

Since the stress concentration into the core is suppressed as such, the favorable tension range permitted at the time of drawing the optical fiber becomes wider, thereby facilitating the tension control at the time of drawing. Also, the stress is prevented from being concentrated into the core in excess, and the increase in transmission loss and the deterioration in transmission characteristics due to insufficient tension control and the like are kept from occurring, whereby an optical fiber having stable transmission characteristics over the whole length thereof is realized.

When the optical fiber drawn by the drawing furnace is heated so as to fall within a predetermined temperature range by the heating furnace disposed downstream the drawing furnace, the resulting optical fiber has excellent transmission characteristics such as a very low transmission loss. Therefore, when employed in a long-distance optical transmission system, it is possible to construct an efficient optical transmission system capable of reducing the number of relay points in which optical amplifiers and the like are installed, for example.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of making an optical fiber preform comprising:
    a synthesizing step of depositing a glass fine particle onto an outer periphery of a core preform including at least a core region, so as to synthesize a glass fine particle layer to become the outermost cladding layer in one or a plurality of layers of cladding in a cladding region disposed at an outer periphery of said core region;
    a dehydrating step of dehydrating said synthesized glass fine particle layer upon heating; and
    a consolidating step of consolidating said dehydrated glass fine particle layer upon heating so as to form said outermost cladding layer, thus forming an optical fiber preform having said core region and said cladding region having said one or plurality of layers of cladding;
    wherein, before consolidating said glass fine particle layer upon heating, doping said glass fine particle layer with fluorine and eliminating a part of doped fluorine from an outer peripheral part including an outer periphery thereof.

2. A method of making an optical fiber preform according to claim 1, further comprising, between said dehydrating step and said consolidating step, an immersing step of doping said glass fine particle layer with fluorine by immersion in a gas atmosphere containing a predetermined concentration of fluorine;
    wherein, in said consolidating step, the concentration of fluorine contained in said gas atmosphere during consolidating upon heating is made lower than said predetermined concentration during immersion, so as to eliminate a part of doped fluorine from said outer peripheral part of said glass fine particle layer.

3. A method of making an optical fiber preform comprising:
    a synthesizing step of depositing a glass fine particle onto an outer periphery of a core preform including at least a core region, so as to synthesize a glass fine particle layer to become the outermost cladding layer in one or a plurality of layers of cladding in a cladding region disposed at an outer periphery of said core region;
    a dehydrating step of dehydrating said synthesized glass fine particle layer upon heating; and
    a consolidating step of consolidating said dehydrated glass fine particle layer upon heating so as to form said outermost cladding layer, thus forming an optical fiber preform having said core region and said cladding region having said one or plurality of layers of cladding;
    wherein said glass fine particle layer is synthesized in said synthesizing step such that said glass fine particle layer is doped with fluorine by using a material gas containing fluorine while said material gas containing fluorine is adjusted such that the doping amount of fluorine successively decreases within an outer peripheral part including an outer periphery thereof.

4. A method of making an optical fiber preform comprising:
    a synthesizing step of depositing a glass fine particle onto an outer periphery of a core preform including at least a core region, so as to synthesize a glass fine particle layer to become the outermost cladding layer in one or a plurality of layers of cladding in a cladding region disposed at an outer periphery of said core region;
    a dehydrating step of dehydrating said synthesized glass fine particle layer upon heating; and
    a consolidating step of consolidating said dehydrated glass fine particle layer upon heating so as to form said outermost cladding layer, thus forming an optical fiber preform having said core region and said cladding region having said one or plurality of layers of cladding;
    wherein said glass fine particle layer is synthesized in said synthesizing step such that said glass fine particle layer is doped with chlorine by using a material gas containing chlorine while said material gas containing chlorine is adjusted such that the doping amount of chlorine successively decreases within an outer peripheral part including an outer periphery thereof, and then thus doped chlorine is substituted by fluorine.

5. A method of making an optical fiber comprising:
    preparing an optical fiber preform comprising a core region and a cladding region provided at an outer periphery of said core region and having one or a plurality of cladding layers doped with fluorine which lowers a refractive index, in which the outermost cladding layer of said one or plurality of cladding layers is configured such that fluorine successively lowers the doping amount thereof in an outer peripheral part including an outer periphery thereof to a predetermined doping amount which is the minimum doping amount of fluorine within said layer; and drawing said optical fiber preform upon heating at a tension within the range of 0.05 to 0.20 N.

6. A method of making an optical fiber comprising:

preparing an optical fiber preform comprising a core region and a cladding region provided at an outer periphery of said core region and having one or a plurality of cladding layers doped with fluorine which lowers a refractive index, in which the outermost cladding layer of said one or plurality of cladding layers is configured such that fluorine successively lowers the doping amount thereof in an outer peripheral part including an outer periphery thereof to a predetermined doping amount which is the minimum doping amount of fluorine within said layer;

drawing said optical fiber preform upon heating; and heating said optical fiber drawn out of a drawing furnace to a temperature within a predetermined temperature range by use of a heating furnace disposed downstream said drawing furnace.

7. A method of making an optical fiber according to claim 6, wherein said heating furnace heats said drawn optical fiber such that said optical fiber attains a temperature within the range of 1100° C. to 1700° C.

* * * * *